US011350382B2

(12) United States Patent
Ly et al.

(10) Patent No.: US 11,350,382 B2
(45) Date of Patent: May 31, 2022

(54) DIGITAL BUOY SYSTEMS AND METHODS

(71) Applicant: United States of America as Represented by The Secretary of The Army, Alexandria, VA (US)

(72) Inventors: Tung N Ly, Lorton, VA (US); Duane N Morrison, Stafford, VA (US); Denise R LaDue, Louisville, KY (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 16/829,929

(22) Filed: Mar. 25, 2020

(65) Prior Publication Data
US 2020/0314794 A1    Oct. 1, 2020

Related U.S. Application Data

(60) Provisional application No. 62/824,274, filed on Mar. 26, 2019.

(51) Int. Cl.
*H04W 64/00* (2009.01)
*G01S 19/51* (2010.01)
(Continued)

(52) U.S. Cl.
CPC ........... *H04W 64/003* (2013.01); *B63B 22/16* (2013.01); *G01S 19/51* (2013.01); *G08B 21/182* (2013.01);
(Continued)

(58) Field of Classification Search
CPC ..... H04W 4/029; H04W 4/021; H04W 4/023; H04W 64/006; H04W 4/80; H04W 64/003; H04W 4/90; H04W 4/02; H04W 4/38; H04W 84/18; H04W 4/027; H04W 4/185; H04W 4/025; H04W 4/70; H04W 4/14; H04W 4/33; H04W 4/40; H04W 4/06; H04W 4/21; H04W 4/08; H04W 4/42; H04W 4/48; H04W 16/26; G08B 13/1427; G08B 21/0269; G08B 21/182; H04L 67/12; H04L 67/22; H04L 67/26; H04L 67/306; H04L 63/08; H04L 63/101; H04L 41/0631; H04L 43/08; B63B 2022/006; B63B 22/00; B63B 22/08; B63B 22/18; B63B 2027/165; B63B 2203/00; B63B 22/16;
(Continued)

(56) References Cited

U.S. PATENT DOCUMENTS

2012/0307676 A1* 12/2012 Chan ................... H04W 24/08
                                                            370/252
2014/0220923 A1*  8/2014 Shoshan ............... H04W 16/32
                                                            455/404.1
(Continued)

OTHER PUBLICATIONS

"Development of an IoT Platform for Ocean Observation Buoys" by Kim et al., dated Apr. 2017 (Year: 2017).*

*Primary Examiner* — Daniel Lai
(74) *Attorney, Agent, or Firm* — Brian C. Jones

(57) ABSTRACT

A distributed and buoy tracking and mesh network communication system includes buoy node devices having critical, designated placement determined navigational guidance criteria. Each buoy node apparatus serves a dual navigation and data transmission function.

18 Claims, 6 Drawing Sheets

(51) Int. Cl.
*G08B 21/18* (2006.01)
*H04W 16/26* (2009.01)
*B63B 22/16* (2006.01)
*H04W 84/18* (2009.01)

(52) U.S. Cl.
CPC ......... *H04W 16/26* (2013.01); *B63B 2203/00* (2013.01); *H04W 84/18* (2013.01)

(58) Field of Classification Search
CPC ......... B63B 49/00; B63B 79/10; G01S 19/13; G01S 19/18; G01S 5/0009; G01S 17/89; G01S 7/415; G01S 11/02; G01S 13/42; G01S 13/72; G01S 13/723; G01S 19/14; G01S 19/42; G01S 19/51; G01C 21/206; G01C 21/165; G01C 21/26; G06G 1/0052
See application file for complete search history.

(56) References Cited

U.S. PATENT DOCUMENTS

2015/0346726 A1* 12/2015 Davoodi ................ B63G 8/001
　　　　　　　　　　　　　　　　　701/21
2017/0318430 A1* 11/2017 Ganti .................... G06K 9/6269
2019/0219026 A1* 7/2019 Sheldon-Coulson ... F03D 7/048
2020/0298949 A1* 9/2020 Gerard .................... B63C 11/48

* cited by examiner

DIGITAL BUOY SYSTEMS AND METHODS

CROSS-REFERENCE TO RELATED APPLICATIONS

This application claims the benefit of U.S. Provisional Patent Application No. 62/824,274 filed Mar. 26, 2019, the content of which is incorporated herein by reference.

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

Embodiments of the present invention relate to the field of network communication systems in maritime and other navigation fields, and particularly but not exclusively, to digital buoy enabled network systems for rapid data transmission and tracking over open waterways.

Description of the Related Art

This section introduces aspects that may help facilitate a better understanding of the invention. Accordingly, the statements of this section are to be read in this light and are not to be understood as admissions about what is prior art or what is not prior art.

The U.S. Coast Guard regulates vessel traffic in inland waterways, such as lakes, rivers and channels. Inland waterways are subject to variable navigation conditions and must be constantly monitored for depth. Inland waterways are used to convey industrial and agricultural products and petroleum, as well as passengers.

It is necessary to safely direct traffic through these waterways, making sure large vessels are not grounded, without unnecessarily obstructing the waterways.

Buoys are the primary method for regulating waterway traffic. Buoys are used to identify safe channels of navigation, with sufficient water depth, taking into account climatic and sedimentation fluctuations. Buoy placement corresponds to locations on navigational charts produced by the U.S. Army Corps of Engineers (USACE).

It is a problem known in the art that 10 to 25 percent of buoys may drift "out-of-station". An out-of-station buoy having a displacement as small as 100 meters renders it non-functional for navigational purposes. A single out-of-station buoy creates a high-risk of vessels becoming lost, unable to navigate to safety or be located in an emergency, and potentially running aground. The Coast Guard responds to more than 16,000 calls per year from vessels that become lost or run out of fuel or experience emergency medical issues.

The proposed methodologies would save tens of thousands of operational dollars a day across the inland waterway system when compared to existing fleet methodologies. These cost savings relate to expenses for personnel, fuel, materials, and services related to operation and maintenance of partner operated buoy maintenance vessels. While operational costs vary across the system due to associated environmental conditions that may affect buoy station conditions, an average hourly cost for one staffed, underway vessel has been estimated by government partners to cost $6,000.00 an hour.

It is an additional problem known in the art that buoy devices are visually indistinguishable from one another and difficult to spot on open water. Experienced vessel operators routinely make navigational errors based on out-of-station buoys. These vessels are often unable to relay information as to their own location based on undifferentiable buoy structures.

It is yet another problem known in the art that tracking systems are unable to receive electronic transmissions from buoys that are remotely located, at considerable distance from land-based transmission towers. Because of the widely dispersed area covered by buoys and limited access to land-based cellular transmission towers, GPS-enabled methods known in the art for tracking vehicles and other objects are impractical and cost prohibitive for tracking buoys.

There have been many attempts in the art to fashion mesh communication networks over open waterways to provide internet connectivity in areas where there is no available internet access. Many wireless mesh networks have been successfully used to provide communication backbones to coastal environments by mounting wireless transceivers on buoys, vessels and other structures to form transmission nodes. Each node receives broadcasts from the other nodes and repeats the transmission until the signal reaches a tower or other device with internet access.

Port authorities must regulate the placement of any object placed in the shipping lanes. Placement of buoys for a mesh network unrelated to navigation would interfere with the critical purpose of the buoys to regulate maritime traffic and would present the potential of visual confusion.

Many related problems are known in the art with respect to designing and deploying effective, reliable mesh networks using moving vessels and drifting buoys. Vessels may leave the area and buoys are subject to unpredictable drift patterns, causing interruptions in the network's connections.

Although mesh networks can minimize interruptions by sending redundant signals, a communications network must maintain sufficient and predictable node density over open water if the vessels may leave the network and buoys are subject to unpredictable drift patters.

Another problem known in the art that the mesh network must avoid or minimize is the need for expensive satellite transmissions. While such transmissions may be appropriate for gathering scientific data from sensors on placed buoys, it is not economically feasible for mesh networks to rely on satellite transmissions to track the migration of buoys, due to the number of redundant signals.

It is a further problem known in the art that the number of redundant signals may cause transmission and processing bottlenecks over wide areas with multiple nodes.

There is an unmet need in the art for a tracking system which can convey the status of out-of-station buoys in real time over geographically distributed maritime networks. There is also an unmet need for a cost-effective system for maintaining a reliable mesh network implemented on buoys that does not interfere with existing processes for regulating congested inland waterways and does not rely on satellite transmission. Embodiments of the present invention provide useful solutions to at least some of these outstanding needs.

SUMMARY

Aspects of the present invention were developed to address the challenges associated with existing mesh network and/or buoy systems. For example, embodiments of the present invention encompass electronic buoy placement and tracking systems and methods for improved management of maritime traffic. Exemplary systems and methods can operate to help maintain the position of buoys used for navigational purposes, so that the buoys do not drift from their critical positions.

Systems and methods disclosed herein provide for the GPS enabled monitoring of floating navigational aids (buoys) in waterways coupled with a mesh-networked communication system to support a low-cost, low-power monitoring and tracking system that is effective to reduce buoy maintenance and material costs, and improve safety of navigation on the waterways. Some embodiments provide hydrographic survey data directly to USCG river tenders to allow for a more accurate placement of buoys in the waterway. In some embodiments, buoys equipped with GPS enabled sensors add to operational cost savings by allowing operators, river buoy tenders, and other individuals to know when a threshold had been reached in "off station" buoys which would indicate the need to service one buoy, or an entire river's collection of deployed buoys. Some systems and methods can be used to help establish or monitor channel and other waterway dimensions. For example, some channels are required to be maintained a maximum width consistent with certain project depths and prevailing conditions. However, in periods of low water, it may be difficult to maintain the published project depth or width. As a result, the channel must be narrowed. Embodiments of the present invention can be used by river tenders and other individuals to maintain project depth and/or width at or above required minimum levels.

Embodiments of the present invention enable monitoring of the real-time position of strategically placed floating aids to navigation (buoys) on Inland Waterway Systems and can deliver both improved levels of maritime safety while at the same time improve navigation resources management by reducing management costs and increasing overall system accuracy of deployed buoys. By deploying low-cost, low-power, peer-to-peer network infrastructure on physically deployed buoys, embodiments of the present invention ameliorate the problem of an 'off-station' buoy as a navigation hazard. Embodiments of the present invention encompass a system of connected buoys and Cloud based distribution of their data, which can dramatically change the cost model of providing buoy maintenance and data management by a fleet of buoy tenders as well as dramatically improving charted positions of buoys. Such technology can be used to service the navigation safety needs of deployed mariners and the public they serve.

There are three 'states' that describe buoys in a waterway navigation system: physically deployed, no data; physically deployed with charted data (often referred to as 'synthetic'); and the virtual buoy which has a data point, but no physical buoy in existence in the real world. Traditional navigation requires the mariner to visually 'acquire' the physically present buoy in the water and navigate between deployed buoys to remain in the active and safe channel. This traditional navigational technique can be further enhanced by collecting real-world coordinates of buoys as buoy tenders either deployed the buoys or performed underway maintenance on them. These positions can be charted in electronic format, thus making available the data used to create a newly described 'synthetic' buoy. The mariner can, with the introduction of the synthetic buoy, both see the buoy on the electronic charting system display and in the real world from any portal on the bridge. Such synthetic data points can be distributed through a broadcast system, which can be very effective, but once the buoy tracks 'off station', the synthetic version of the associated buoy becomes—potentially—a hazard to navigation: a mariner not noting the difference between charted location of the synthetic buoy and the deployed, and now off station, physical buoy could potentially make a piloting error that proved costly to life and property. The third state of buoy, the 'virtual' buoy, could potentially resolve the conflict between an off station buoy and a charted synthetic buoy as there would never actually be a related physical buoy that related to the virtual buoy; there would only ever be an electronically charted buoy that appeared on the underway vessel's electronic chart system display, and in the correct location. Embodiments of the present invention encompass a novel approach wherein a buoy state can provide for real-time positioning of a real world physical buoy through a network of deployed buoys equipped with low-cost GPS and network communication devices, and periodically spaced base stations.

It has been estimated that for every vessel that runs aground, redeployment costs may be approximately $500K. Embodiments of the present invention provide for the improvement of navigation safety by enabling underway mariners to know, with precision, whether deployed buoys (visible on screen and through a portal) are off-station. Additionally, embodiments enable the visualization of a large buoy collection (e.g. 12,000+ collection of buoys) and the indication of which of those buoys is off station and in need of service, or missing. As such, embodiments empower fleet commanders with decisions that can potentially not only save them hundreds of thousands of dollars a year, but also improve the efficiency with which they maintain an accurately deployed set of physical buoys on the waterways. It has been estimated that it costs approximately $6K an hour to operate a buoy tender. It is desirable for commanders to deploy tenders to maintain buoys on stretches of waterways on periodic and planned schedules with true knowledge of the overall state of buoys and their status of off station, or on station. Utilizing embodiments of the present invention can potentially provide savings of $24K in just one 40 hour work week by delaying just one vessel's deployment until actual, live data suggested that a condition existed that warranted deployment of the tender and its crew.

Embodiments of the present invention enable the deployment and activation of a peer-to-peer network at various test sites that can connect deployed buoys with base stations and Cloud based web services infrastructure. The low-cost, deployable buoy kits can communicate with each other, with base stations, and also with deployed vessels (if desired). The data served back to the Cloud service can allow for re-distribution of the data along with data tags that will allow for identification not only of the buoy's unique ID, but also whether or not it is off station, or not. Users with waterway responsibilities can benefit from this data exchange not only through increased navigation safety of mariners travelling through their district areas of responsibility, but also through the deployed network of linked network devices that could potentially be deployed at infrastructure objects such as locks, dams, levees, and the like.

Embodiments of the present invention encompass systems and methods for use with virtual buoys and other manifestations of electronic representations of buoys and physically placed floating aids to navigation.

Embodiments of the present invention encompass a distributed computer apparatus and buoy tracking system comprised of buoy node devices, each of which includes a GPS receiver component which receives GPS signals, a processor to create node data packets which include the quasi-unique identification number of the buoy node device, a unique time stamp and concurrent GPS location coordinates of the buoy node device that correspond with the time indicated by the time stamp. The buoy node device further includes a transceiver which receives streams of node data packets from other nodes and which transmits streams of node data packets to other nodes, gateway devices and/or computers.

In various embodiments, the system may include gateway components, server components or other computer components which continuously calculate the distance between the actual position of each buoy node device within the system relative to its critical position, the path traveled by each buoy node device, and the projected path of each buoy node device.

The server includes a server processor which receives and parses information from the node data packets, and one or more database data packets which stores the quasi-unique buoy identification numbers, and at least one set of GPS coordinates associated with a time stamp parsed from one or more node data packets.

Embodiments of the present invention encompass a distributed computer apparatus comprised of buoy node devices, each of which includes a GPS receiver component which receives GPS signals, a processor to create node data packets which include the quasi-unique identification number of the buoy node device, a unique time stamp and concurrent GPS location coordinates of the buoy node device that correspond with the time indicated by the time stamp. The buoy node device further includes a transceiver which receives streams of node data packets from other nodes and which transmits streams of node data packets to other nodes, gateway devices and/or computers.

In various embodiments, the system may include gateway components, server components or other computer components which continuously calculate the distance between the actual position of each buoy node device within the system relative to its critical position, the path traveled by each buoy node device, and the projected path of each buoy node device.

The server includes a server processor which receives and parses information from the node data packets, and one or more database data packets which stores the quasi-unique buoy identification numbers, and at least one set of GPS coordinates associated with a time stamp parsed from one or more node data packets.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Figure 1:
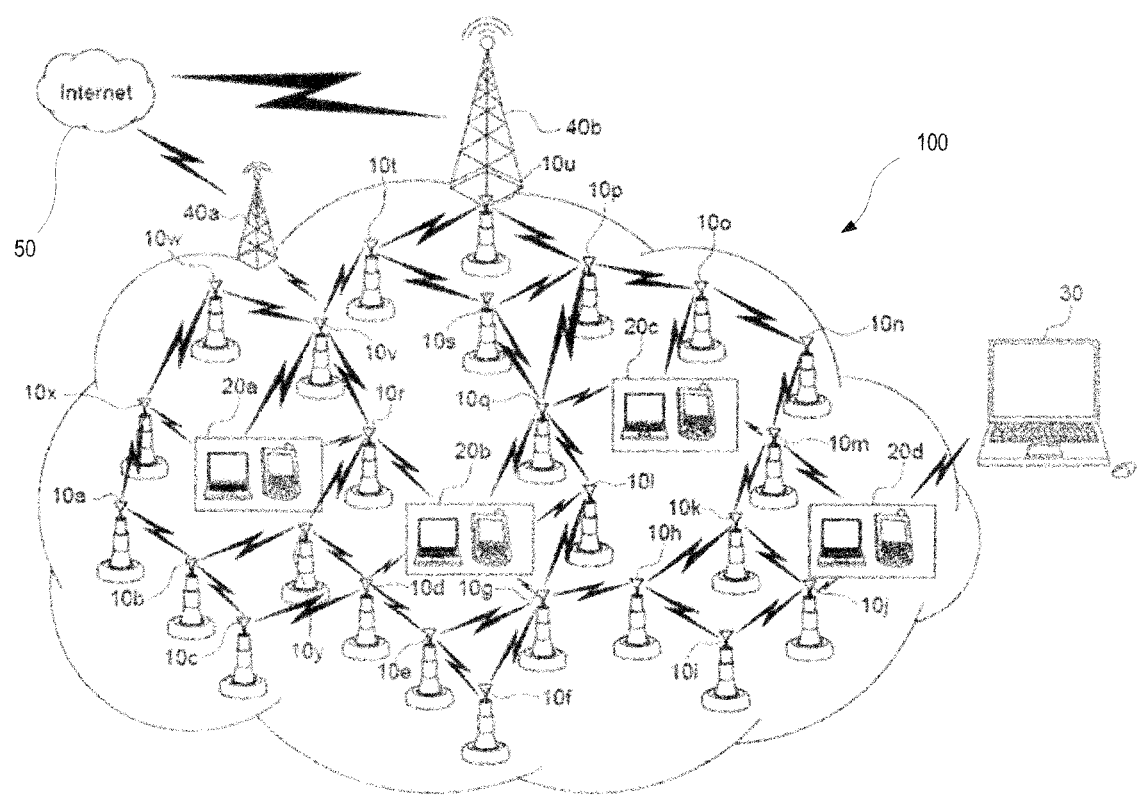
FIG. 1 illustrates an exemplary mesh network communication system for buoy node tracking, according to embodiments of the present invention.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term "buoy" means one of system of floating structures that is authorized for placement in waterways regulated by the government.

As used herein, the term "buoy node device" means a buoy configured to transmit and receive data with any components known in the art.

As used herein, the term "communication gateway" is a type of gateway that may communicate with buoy node devices and other network devices that may use different communication protocols.

As used herein, the term "gateway" means a node device which is a computer processor link between computer processors, allowing them to share information and process data received from buoy node devices.

As used herein, the term "instantiate" means create a new instance of a processing component, class, object or other data structure.

As used herein, the term "node data packets" means data structures for monitoring the location coordinates for each buoy node having a unique identification number at a specific point in time.

As used herein, the term "server" means a computer which receives transmissions from buoy node devices and buoy gateway devices, including buoy communication devices As used herein, the term "threshold" means a value which will trigger an alert if a monitored condition is above or below the value.

As used herein, the term "user query" means a query based on user specified criteria to retrieve data, or to identify whether a threshold or matching condition is met.

As used herein, the term "virtual component" or "virtual processing component" refers to code with utilized processing capability from a general processor to perform a specific or designated function, similar to that which would be performed by a specially configured hardware device.

Embodiments of the present invention enable for the large scale remote monitoring of marine navigation buoys/markers and other water-borne assets economically using Peer-2-Peer/Mesh Network. Embodiments also enable for the independent, reliable, and secure remote identification and/or monitoring of water-borne assets (e.g. marine traffic, vessels) using the networked buoys/markers. Such techniques can also be applied to land navigation. Further, embodiments enable positioning capabilities for marine navigation for the vessels/personal crafts without GPS using the geospatial enabled networked buoys/markers. Such techniques can also be applied to land navigation. In some instances, embodiments provide an alternate communication of low bandwidth/high latency applications such as SMS/Text/Pictures Messaging for waterways where there is limited or no mobile phone coverage. Such techniques can also be applied to land navigation. Embodiments also enable for the provision of micro charts/maps (e.g. updated) to local/vicinity areas around the individual buoys/markers to support emergency (e.g. last minute) navigations, including applications for toxic spills, dam/levee breaks, re-routing local traffic, and the like. Such techniques can also be applied to land navigation. Embodiments of the present invention also provide for deployed buoy monitoring and networked dynamic data delivery systems.

FIG. 1 illustrates an exemplary Digital Buoy Tracking System 100, which includes buoy node devices 10a though 10y, node gateways 20a through 20d, server 30, and internet access points 40a and 40b. In some embodiments, system 100 may be provided as a mesh network system.

In the exemplary embodiment shown, GPS enabled buoy node devices 10a though 10y are each operatively coupled with a transceiver device, known in the art, capable of receiving and transmitting data packets to adjacent buoy node devices 10a though 10y that are within range. Transmission may be accomplished using any wireless or other transmission protocol known in the art, including but not limited to protocols compliant with the 802.11 standard.

In the exemplary embodiment shown, buoy node devices 10a though 10y are access points that form a peer-to-peer mesh network which transmit data to internet access point 40a and/or 40b.

In the exemplary embodiment shown, internet access points are 40a and 40b are cellular towers or antennae, but may be any devices known in the art for providing internet connectivity (e.g. via an internet 50).

In one exemplary embodiment, Digital Buoy Tracking System 100 may transmit data packets of various types directly to server 30, including node data packets. Node data packets are data structures for monitoring the location coordinates for each buoy node. Node data packets contain data values including but not limited to: a quasi-unique buoy identification number and a set of GPS coordinates associated with a unique time stamp. These data are a record of the actual location of the buoy identified by the identification number at the point in time recorded in the time stamp.

In one exemplary embodiment, each buoy node device processor includes virtual processing capability to create and transmit an outgoing stream of node data packets. In various embodiments, each buoy node device processor also has virtual processing capability to receive and transmit one or more incoming node data packets from other buoy node devices.

In one exemplary embodiment, Digital Buoy Tracking System 100 may be implemented on a mesh network that uses transceivers which communicate via dedicated mesh links to each neighboring node within range in the mesh network.

In one exemplary embodiment, the mesh network is a switched mesh network, in which a portion of the available bandwidth of each separate radio channel is dedicated to the link between one node and the neighboring node. The total available bandwidth is the sum of the bandwidth of each of the links. Each dedicated mesh link is on a separate channel, ensuring that forwarded traffic does not use any bandwidth from any other link in the mesh. As a result, a switched mesh is capable of much higher capacities and transmission rates than a shared mesh and grows in capacity as nodes are added to the mesh.

In various embodiments, buoy node devices 10 may include solar-powered GPS circuit boards that can report the position of the buoy.

In various embodiments, node gateways 20a through 20d include computer components and processing components to track and store buoy node device 10 location data, and a data structure to store buoy event data. In alternate embodiments, node gateways 20a through 20d may eliminate redundant transmissions to reduce the transmission loads on internet devices and on server 30.

In other exemplary embodiments, node gateways 20a through 20d may be configured with additional processing capability to perform other processes (e.g. filtering, routing, and redirecting). Node gateways 20a through 20d may optionally function as a gateway and be programmed to reduce the amount of data, including redundant signals, which is transmitted through the mesh network.

In other exemplary embodiments, node gateways 20a through 20d may include processing capability to compare a critical buoy location to an actual location, and send an alert when a buoy has drifted more than a threshold distance from its critical location.

In other exemplary embodiments, node gateways 20a through 20d may include communication gateways which may be virtual components (software) which enables communication between buoys and other wireless access and communication devices which utilize heterogenous communication protocols.

In various embodiments, portable devices on boats or other vessels may serve as nodes, gateways, or servers. For example, node gateways such as node gateway 20a may be provided as a device on a boat or other vessel.

In various embodiments, Digital Buoy Tracking System 100 may create a local mesh network that can transmit and relay node data packets to a base station that has wider area network connections.

In various embodiments, node gateways 20a through 20d may be configured with actual or virtual transceivers having two or more data or signal transmission channels. For example, one channel may be dedicated to transmitting node data packet structures. A stream of node data packets from a dedicated channel may enable real-time monitoring of buoys which have drifted out of position. One or more additional channels may be used for other data transmissions and communication signals.

According to some embodiments, configurations such as those depicted in FIG. 1 encompass techniques for using additional land-based nodes as repeater to bridge or span the gaps between water-based nodes where it is logistically convenient or upon emergency (e.g. accidently removal of buoys nodes).

Figure 2:
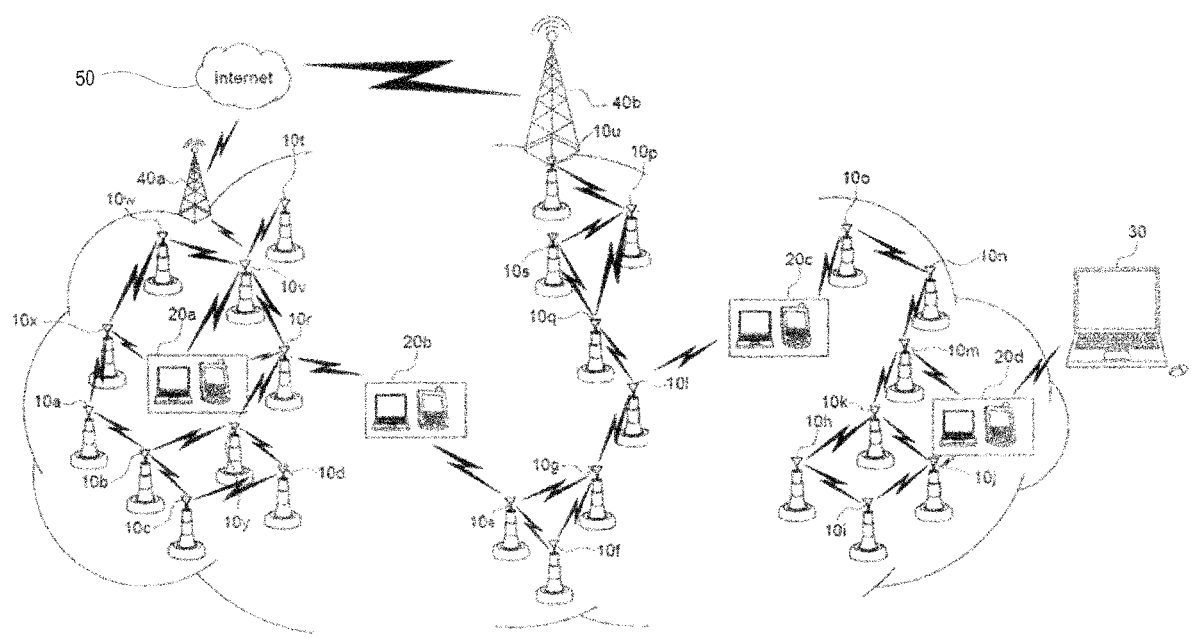
FIG. 2 illustrates an exemplary mesh network comprised of multiple geographical segments operatively coupled by gateways, according to embodiments of the present invention.

FIG. 2 illustrates an exemplary mesh network comprised of multiple geographical segments operatively coupled by node gateways 20a through 20d.

In the exemplary embodiment shown, Digital Buoy Tracking System 100 includes at least one wireless cluster of networked buoys with separate local groups of networked buoy node devices 10a through 10y capable of cluster to cluster communications or cluster to land tower communications.

In various embodiments, each wireless cluster of networked buoys may be geographically separated and operatively coupled by node gateways 20a through 20d and/or server 30. Internet access points 40a and 40b can be cellular towers or antennae, but may be any devices known in the art for providing internet connectivity (e.g. via an internet 50).

In various embodiments, each wireless cluster of networked buoys may have one or more node gateways 20a through 20d.

Figure 3:
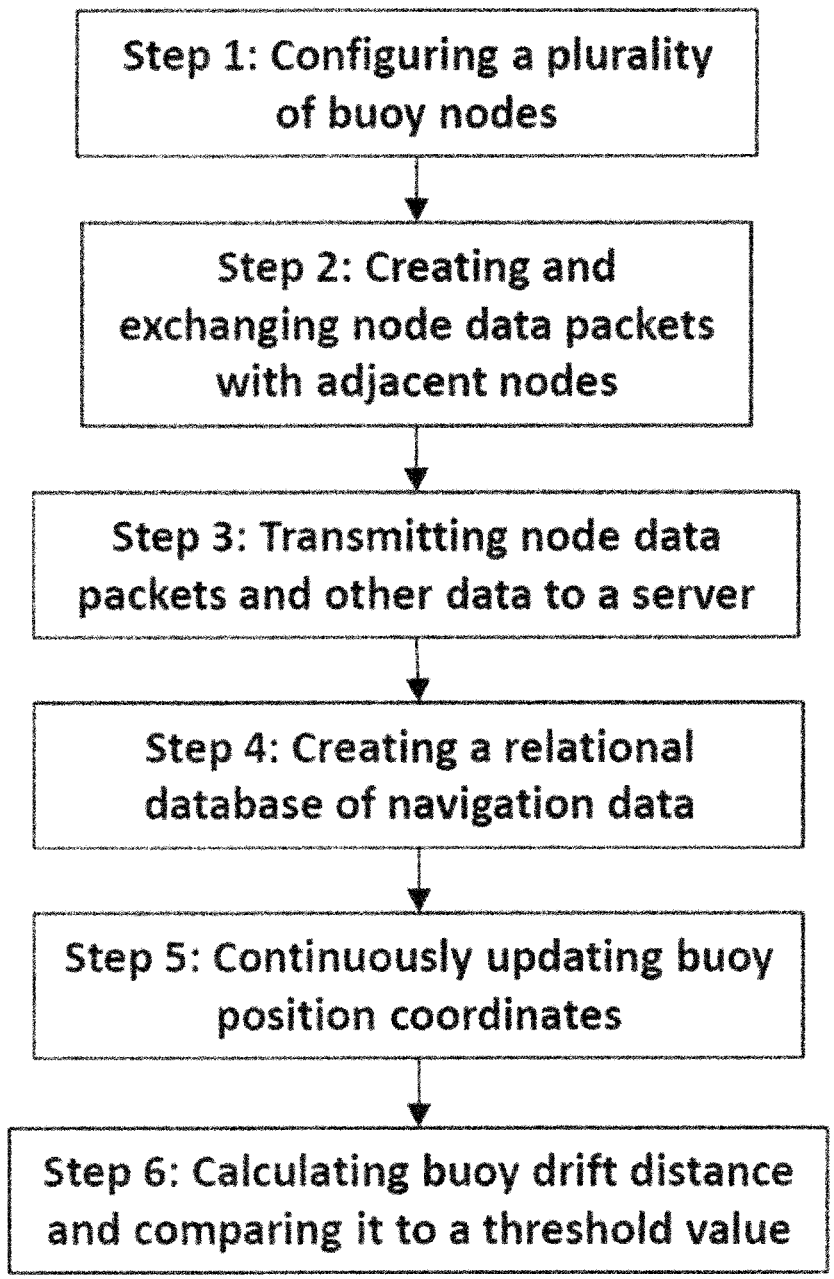
FIG. 3 illustrates an exemplary embodiment of a method for displaying and updating buoy position coordinates in real time, according to embodiments of the present invention.

FIG. 3 illustrates an exemplary embodiment of method 200 for displaying and updating buoy position coordinates in real time.

Step 1 is the step of configuring a plurality of buoy nodes.

This step is comprised of coupling a buoy with a computer hardware device having a quasi-unique identification number, a GPS receiver, and a mesh transceiver to create a plurality of buoy nodes. The computer hardware device includes a GPS receiver known in the art, and a processor capable of creating and transmitting node data packets which include the quasi-unique identification number, current location coordinates and time stamp.

Step 2 is the step of creating and exchanging node data packets with adjacent nodes. Each node data packet stores a quasi-unique buoy identification number and a set of GPS coordinates associated with a unique time stamp. According to some embodiments, steps for configuring the buoy nodes can encompass various options. Time intervals in which GPS modules to acquire and update the location information can be programmed/modified to slow down to save energy or speed up for emergency operations.

Each computer hardware device is configured with virtual processing capability to create and transmit an outgoing stream of node data packets which include the quasi-unique buoy identification number and at least one set of GPS coordinates associated with a time stamp. Each buoy node includes a mesh transceiver component 10 for transmitting said outgoing stream of data packets, and for receiving one or more incoming node data packets from other buoy node devices. According to some embodiments, a mesh radio of each node can be programmed to slow down the data rate and communication rate to save energy or speed up for emergency operations.

Step 3 is the step of transmitting node data packets and other data to a server or gateway via the mesh network. Various gateways may serve as both nodes and servers. In one exemplary embodiment, a gateway component is a component that receives and transmits node data packets.

Step 4 is the step of creating a relational database of navigation data for each buoy. In this step, the server processor receives, parses, and stores information from node data packets. Then, the server creates one or more database data structures which store GPS coordinates associated with a time stamp and quasi-unique buoy identification numbers.

Step 5 is the step of continuously updating buoy position coordinates.

In this step, the server continuously updates the actual location coordinates of each buoy in the database as it receives new node data packets.

Step 6 is the step of calculating the distance between the critical position and actual position of a buoy and comparing that distance to a threshold value.

In various embodiments, and with returning reference to FIG. 1 and/or FIG. 2, system 100 includes a user query interface that receives the buoy ID number and queries the database to retrieve the buoy node device's actual location and critical location, calculate the distance between the two positions, compare that distance to a threshold value, and issue an alert if the distance surpasses the threshold value. In various embodiments, the threshold value may be user defined.

Embodiments of the present invention encompass computer program products for performing any of the methods disclosed herein. For example, embodiments encompass computer program products for displaying and updating buoy position coordinates in real time as depicted in FIG. 3. Embodiments may also encompass computer program products for creating a mesh network system, where the computer program product is embodied on a non-transitory tangible computer readable medium, and includes computer-executable code for exchanging information between at least two buoy node devices receiving flow measurement information, and computer-executable code for mapping a cluster of buoy node devices and assigning a critical position to each of the buoy node devices. According to some embodiments, if a drift distance of a buoy is greater than a threshold, an alert/alarm can be raised on the map display and/or using any other communication methods to the authorities/users.

Other method embodiments for creating a mesh network system include providing a plurality of buoy node devices (e.g. Step 1) for a wireless network, where each of the buoy node devices is configured to exchange information with at least one other buoy node device, exchanging information between at least two buoy node devices, and mapping a cluster of buoy node devices and assigning a critical position to each of the buoy node devices. Methods may also include assigning a scheduling sequence to each of the buoy node devices in the critical position. Further, methods may include configuring a gateway communication component to filter redundant buoy node communications. Methods may also include prioritizing the buoy node devices to receive data. In some cases, the prioritizing is based on the distance of the buoy node devices from a device providing a connection to a wide area network. In some cases, methods may include receiving and transmitting node data packets. In some cases, methods may include calculating the distance between an actual position and a critical position of a buoy node device. In some cases, methods may include calculating the path traveled by one of the buoy node devices. In some cases, methods may include calculating a projected path of each of the buoy node devices. In some cases, methods may include updating a user interface to display a current configuration of each of the buoy node devices. Some methods may include performing a system query to determine a matching condition for a set of GPS coordinates associated with one or more of the buoy node devices to determine if a sufficient number of the buoy node devices can be detected. Some methods may include configuring a plurality of geographically separated mesh networks which are operatively coupled by a server component. Some methods may include configuring one or more gateway communication components to function as a bridge between devices having heterogeneous wireless protocols. Some methods may include configuring one or more gateway communication components to send an alert if the number of transmissions from adjacent buoy node devices falls below a threshold level for node density transmission. Some methods may include configuring the server component to perform an update function to update GPS coordinates in a database data structure each time a node data packet is received. Some methods may include authenticating transmissions initiated by users. Some methods may include populating a database of users. Some methods may include establishing a rule set for transmission. In some cases, the rule set includes user authentication parameters and/or transmission parameters. Some methods may include calculating optimized transmission parameters which correspond to the navigation purpose and critical, required, or desired placement of the buoy node devices.

Figure 4:
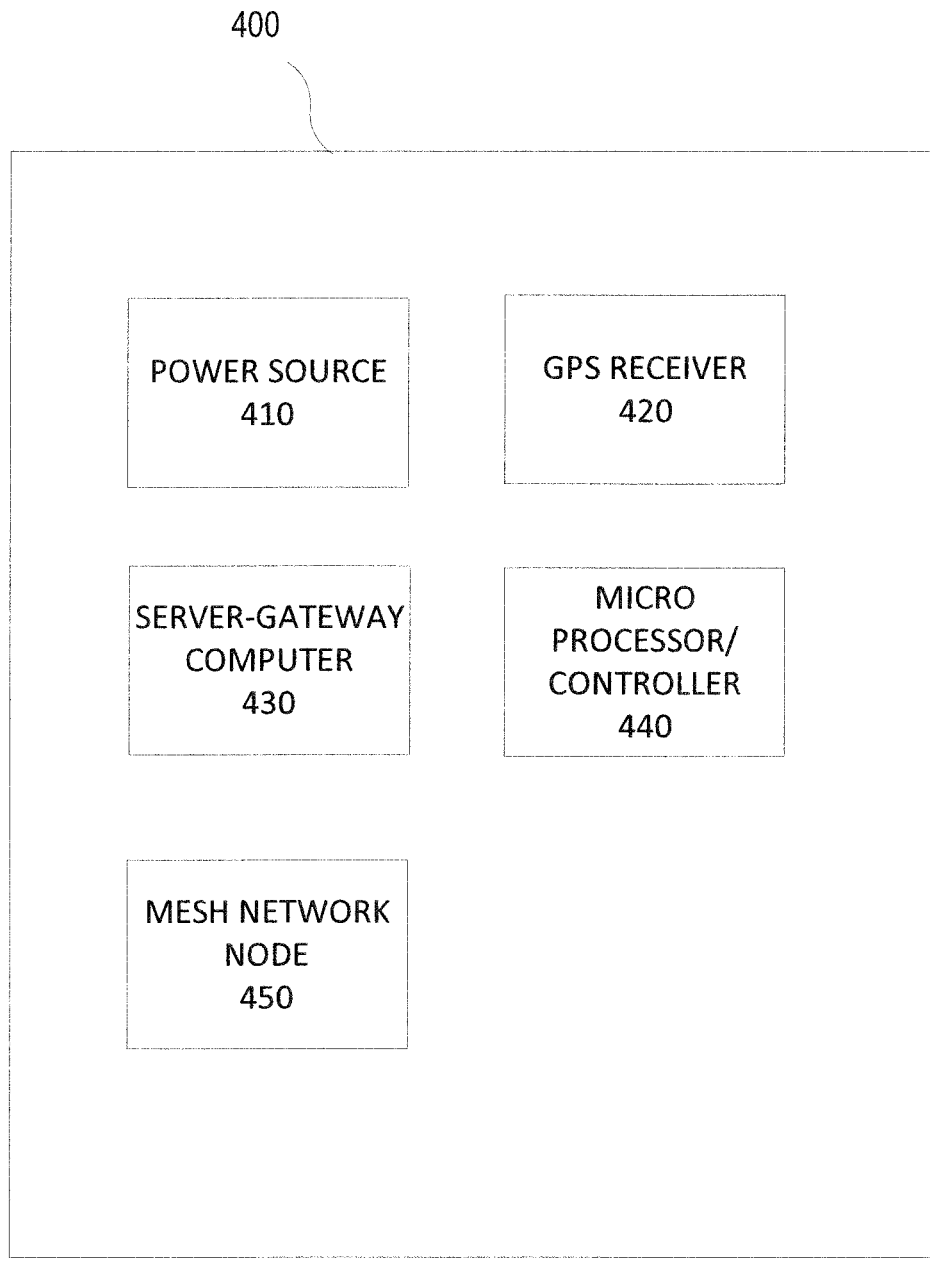
FIG. 4 depicts aspects of a buoy node, according to embodiments of the present invention.

FIG. 4 depicts aspects of a buoy node 400 according to embodiments of the present invention, which may be incorporated into or part of exemplary buoy tracking systems and methods. As shown here, buoy node 400 can include a power source 410 (e.g. rechargeable battery), a GPS receiver 420, a server-gateway computer 430 (e.g. one per mesh network cluster), a micro processor/controller 440, and/or a mesh network node 450.

Figure 5:
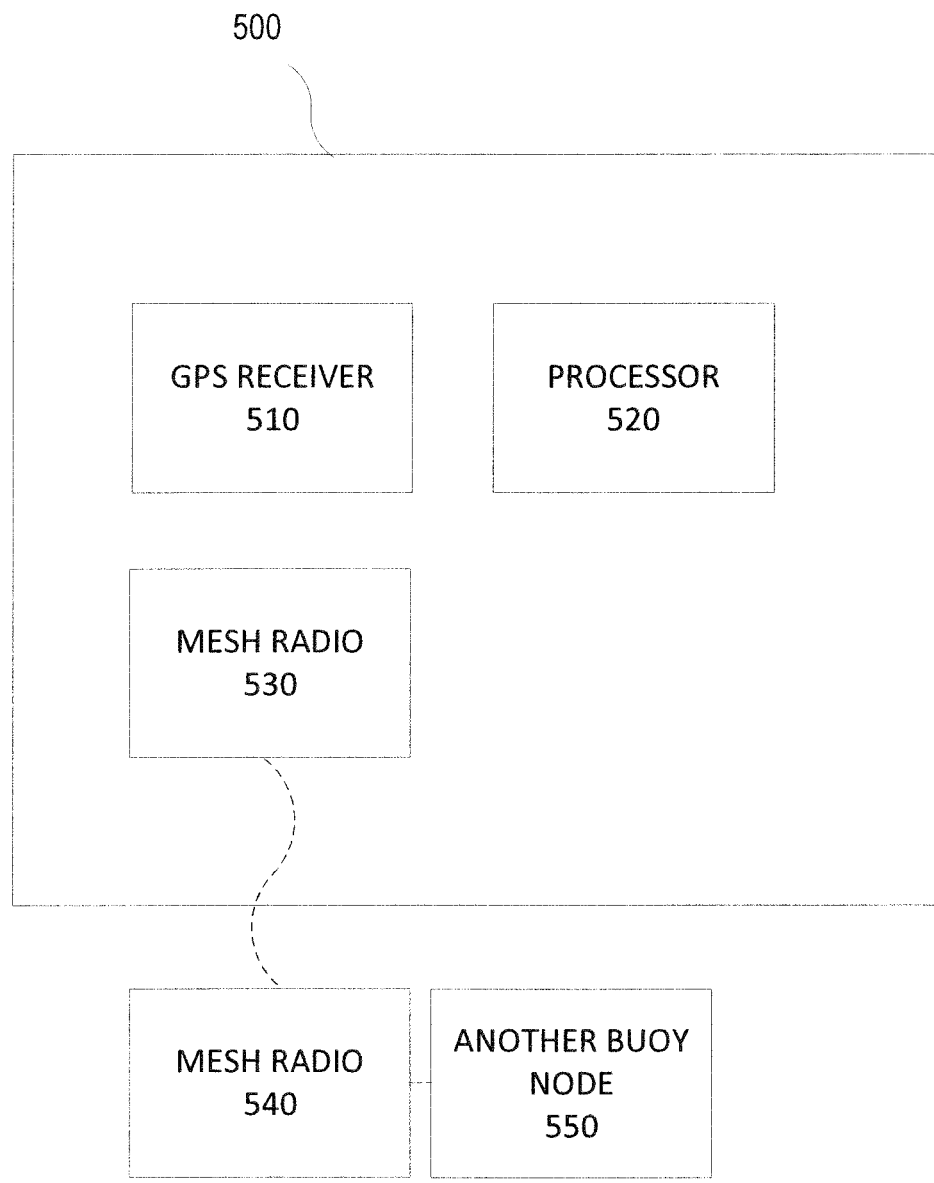
FIG. 5 depicts aspects of a buoy node, according to embodiments of the present invention.

According to some embodiments, FIG. 4 depicts aspects of a more complete chain from a buoy node to a gateway/server computer or a buoy node that can house/built-in a gateway computer, whereas FIG. 5 is for a more simple single buoy node (the majority) the supplied power can be derived from a variety of sources (e.g. solar, battery, hydrodynamo, and the like).

Figure 6:
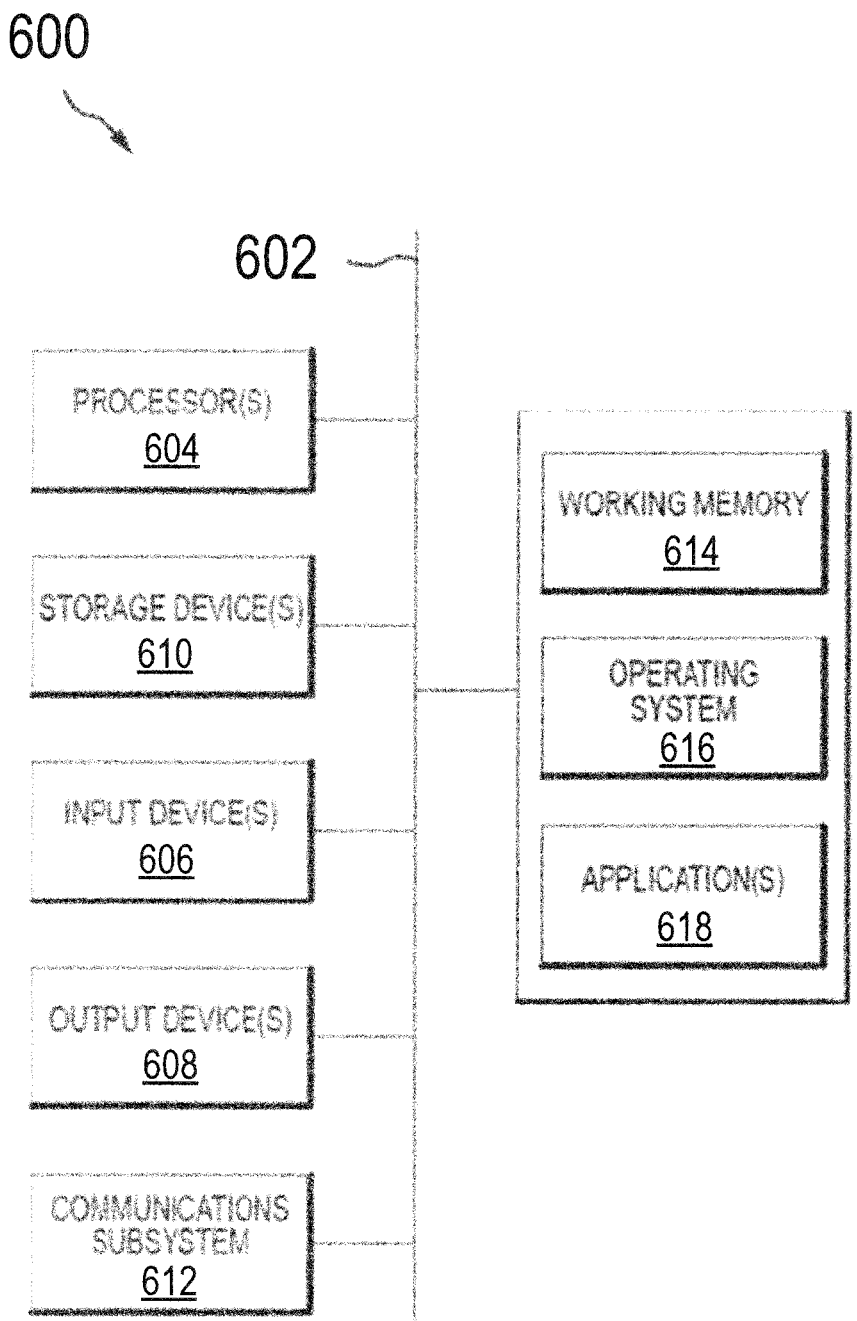
FIG. 6 depicts aspects of a computer system, according to embodiments of the present invention.

FIG. 5 depicts aspects of a buoy node 500 according to embodiments of the present invention, which may be incorporated into or part of exemplary buoy tracking systems and methods. As shown here, the buoy node 500 includes a GPS receiver 510, a processor 520, and/or a mesh radio 530. The mesh radio 530 can be in communication or connectivity with a mesh radio 540 of another buoy node 550. The GPS receiver 510 can operate to store and/or transmit coordinate and/or time data. The processor 520 can operate to process unique ID data, structures, timing, and other calculations. Mesh radio 530 and/or 540 can operate to process a data packets exchange. Embodiments of the present invention encompass buoy tracking systems having a plurality of buoy node devices 500. In some cases, one or more of the buoy node devices 500 includes a GPS receiver component 510 in communication with a GPS satellite, and capable of receiving and storing location coordinates. Buoy node devices can also include a computer processing component having a processor 520, an electronic storage location operatively coupled with the processor 520, and processor executable code stored on the electronic storage location and embodied in a tangible non-transitory computer readable medium. Such computer components are shown in FIG. 6. With returning reference to FIG. 5, the processor executable code can include machine-readable instructions that, when executed by the processor 520, cause the processor 520 to extract the location coordinates to iteratively instantiate a node data packet with a quasi-unique buoy identification number, a unique time stamp and stored location coordinates to create a navigational data stream comprised of one or more of the node data packets. Buoy node devices 500 can also include a transceiver component (e.g. mesh radio 530) for transmitting the navigational data stream, and for receiving one or more incoming node data packets from one or more other buoy node devices 550. In some cases, buoy node devices 500 can continuously transmit the data node packets to other transceiver components within range. In some cases, a transceiver (e.g. radio 530) can receive a first continuous stream of the data node packets and concurrently transmits a second continuous stream of the node data packets. In some cases, a transceiver (e.g. radio 530) is a multi-channel transceiver, which can support heterogenous data types on each channel. In some cases, a buoy tracking system can include an internet device in communication with a buoy node device 500 to provide internet connectivity. In some cases, an internet device is a land-based device. In some cases, a buoy node device 500 can include a node gateway. A node gateway can include a filter to reduce redundant transmissions of node data structures. In some cases, a node gateway can filter redundant transmissions based on time stamp data. In some cases, a node gateway can include a processor to calculate the distance between the critical position and actual position of the buoy node device. In some cases, node gateway includes a processor to compare the distance to a threshold value and instantiate an alert data packet if the distance is greater than the threshold value. In some cases, the node gateway is a communications gateway that enables one or more buoy node devices to use heterogenous protocols to communicate with other buoy node devices.

Embodiments of the present invention encompass mesh network systems having a plurality of buoy node devices 500. In some cases, one or more of the buoy node devices 500 includes a GPS receiver component 510 in communication with a GPS satellite, and capable of receiving and storing location coordinates. Buoy node devices can also include a computer processing component having a processor 520, an electronic storage location operatively coupled with the processor 520, and processor executable code stored on the electronic storage location and embodied in a tangible non-transitory computer readable medium. Such computer components are shown in FIG. 6. With returning reference to FIG. 5, the processor executable code can include machine-readable instructions that, when executed by the processor 520, cause the processor 520 to extract the location coordinates to iteratively instantiate a node data packet with a quasi-unique buoy identification number, a unique time stamp and stored location coordinates to create a navigational data stream comprised of one or more of the node data packets. Buoy node devices 500 can also include at least one node gateway component which receives and transmits the node data packets and has capabilities to continuously calculate the distance between an actual position and a critical position of each said buoy node device, a path traveled by each buoy node device, and a projected path of each buoy node device. A mesh network system can also include a server, which has a server processor which receives and parses information from the node data packets; and one or more database data packets which stores the quasi-unique buoy identification numbers, and at least one set of GPS coordinates associated with a time stamp parsed from one or more node data packets. In some cases, the mesh network system includes a user interface configured to receive user input and create a user query. In some cases, the user query includes one of the quasi-unique buoy identification numbers. In some cases, the user query includes GPS coordinates. In some cases, a node gateway component is further configured to transmit an alert if user-defined thresholds are met. In some cases, a system includes a plurality of geographically separated mesh networks which are operatively coupled by the server. In some cases, a system includes more than one node gateway components. In some cases, a server can be further configured to perform an update function to update the GPS coordinates in the database data packet each time the server receives the node data packets.

Buoy tracking systems and methods as disclosed herein can enable the accurate and remote tracking of buoys, which can be helpful to engineers or other individuals who may need to relocate buoys which have drifted from their original or previous positions. Mariners, and commercial and recreational boaters can also use buoy tracking systems and methods as disclosed herein to obtain accurate buoy positions, so as to help avoid dangerous situations such as accidents, groundings, collision, and the like. Exemplary buoy tracking systems and methods can be used with or incorporate different types of data communication networks and/or topologies, including without limitation WiFi, Cellular Mobile, and Ad-Hoc (P2P, Mesh). Buoy nodes can include devices having small batteries and/or solar-powered GPS circuit boards that can report position data (e.g. position of the buoy). Exemplary buoy tracking systems and methods can operate to remotely read the ID (e.g. unique for each buoy) and coordinates, and such data can be be used to monitor and plan buoy tendering operations. In some cases, buoy data can be updated in near real-time. Exemplary buoy tracking systems and methods can incorporate different types of sensors, such as GPS, range finder, RFID, bar code with a unique ID for each buoy, and the like. In some cases, a local mesh network can transmit and relay buoy data to a base station that has wider area network connections. In some cases, a system can read the buoys tags remotely such as from water-borne vessels and/or nearby land structures/mobile platforms. In some cases, data read from the network can be used to monitor and plan buoy tendering operations. Embodiments of the present invention also encompass web-based geospatial applications for monitoring and tracking of buoys. Chart and buoy information can be updated via the Internet for public, government, and commercial users.

In one exemplary embodiment, a user interface receives actual position coordinates for a buoy and queries the database to report the ID for that buoy, the critical position coordinates, and the distance between the actual and critical positions.

In one exemplary embodiment, a user query interface receives an actual position, critical position, or ID number for a buoy to query the database and report the recent path of travel for the associated buoy. This can be used for analyzing currents and water flow, or other hydrodynamic properties of the body of water in which the buoy is located.

In one exemplary embodiment, a user interface receives a query for out-of-station buoys and reports the identification number and actual position of all buoys for which the distance between the actual position and the critical position is greater than a user-defined distance.

Embodiments of the present invention encompass buoy devices with location and communication technology enabling the verification of the location of buoys and the monitoring of the quality of water flowing past them. Exemplary tracking systems provide a low-cost, low-power, highly reliable self-deploying network monitoring and tracking capability to reduce buoy maintenance and material costs and improve safety of navigation on waterways. Exemplary tracking systems also can provide an "Internet of Things" network capability along waterways (e.g. of a nation) that enable the collection of hydrological and environmental data from the waterways.

Buoy tracking systems and methods disclosed herein can provide reliable mesh operations and self-healing without any human intervention. In some embodiments, a mesh can form and heal autonomously, minimizing labor costs for operations support. Embodiments also enable location reporting through the mesh using an inexpensive GPS chip integrated with the mesh radio chip. In some cases, a beacon capability allows the same mesh radio deployed on a buoy to interrogate a mesh tag applied to barges or other boats, and pass that report along the same mesh network to a server system in order to help track hazardous cargo and/or measure local traffic levels in real-time. In some cases, reliable long-range mesh hops can exceed one mile so that communication across larger distances between buoys and other mesh equipped infrastructure can be achieved, for example for many miles along a river.

Embodiments may also enable single hop ranges. For example, buoy tracking systems and methods disclosed herein can enable longer single hop radio ranges than have previously been attempted. A single hop radio range can be a function of, the radio's transmitter power levels, the radio receiver sensitivity, the mesh device internal antenna pathways (e.g. resulting in losses in signal strength), the antennas themselves, the terrain the radio waves must propagate across, and/or the radio frequency transmissivity of any material between pairs of radio antennas. Embodiments of the present invention encompass long linear mesh networks having multiple hops. GPS mesh devices attached to the buoys can reliably report buoy location in near-real-time through the mesh network to a small test server, with location plotting in Google Earth. The ability to use the mesh network's transponder or pinging mode by a beaconing feature also demonstrates that unique mesh ID applied to vessels can reliably and autonomously report a vessel's passing of each buoy. Advantageously, this capability enables the tracking of vessels containing hazardous material.

Buoy tracking systems and methods disclosed herein are well suited for use in maritime environments where water and water vapor can impede radio frequency communications, in high data traffic levels where larger populations may require larger amounts of data transfer in large-scale deployments, and/or across long ranges where buoys can be dispersed across a wide geographical area.

Buoy tracking systems and methods disclosed herein enable the extraction, display, and/or storage of location data or reports from mesh devices equipped with GPS receivers. Exemplary sensor mesh embodiments also include a beaconing feature where inexpensive mesh devices can notify the network that they are within range of a specific mesh device. For application on an inland waterways, for example, this can allow inexpensive unique ID mesh devices applied to individual barges to report their passing to each buoy in the river. Advantageously, this feature can be used for tracking individual barges containing hazardous materials (e.g. toxic or flammable chemicals), or for monitoring overall traffic levels, and the quantity and location of barges approaching various locks. The beaconing feature can be used at the distances required for barges passing river buoys.

A unique ID embodiment can involve mesh devices installed on vessels that may optionally be part of the mesh network, responding to beacons broadcast by buoys that are on the mesh network, and optionally by other mesh devices (for example from a fixed mark at the entrance to a lock). Since the buoys and fixed marks can be on the mesh network, those devices can be used to collect any responses from the mesh device on the barge, and it is possible to forward the responses through the mesh and the mesh gateway to one or more servers.

In some embodiments, battery powered devices operating as a wireless sensor mesh network can be applied to inland waterway buoys, so the buoys can report their location to "mesh gateways" that are located in buildings or other infrastructure near the stretch of river being monitored. Mesh gateways can be connected to the Internet through either conventional Internet networks (e.g. premise Ethernet or local Wi-Fi), or through mesh gateways equipped with cellular modems for connection to the Internet. Mesh gateways can also use emerging 5G capabilities now being deployed in urban areas to connect to the Internet.

Because each mesh gateway can provide internet connectivity for several hundred battery powered mesh devices, the cost of communications per mesh device is a fraction of the cost of using cellular technologies on every buoy, especially when considering the cost of powering cell modems on a buoy on a river.

Wireless sensor mesh network embodiments can be designed for application to untended and unpowered assets, and can enable ultra-low power consumption while maintaining continuous connectivity. The wireless sensor mesh network devices may consume only ¹⁄₁₀₀th the power of a cell modem or long-range Wi-Fi device. In some embodiments, a single D Lithium battery can provide continuous network connectivity for over ten years, without requiring recharging.

FIG. 6 depicts an exemplary computer system or device 600 configured for use with a buoy tracking system according to embodiments of the present invention. An example of a computer system or device 600 may include an enterprise server, blade server, desktop computer, laptop computer, tablet computer, personal data assistant, smartphone, any combination thereof, and/or any other type of machine configured for performing calculations. Any computing devices encompassed by embodiments of the present invention may be wholly or at least partially configured to exhibit features similar to the computer system 600.

The computer device 600 of FIG. 6 is shown comprising hardware elements that may be electrically coupled via a bus 602 (or may otherwise be in communication, as appropriate). The hardware elements may include a processing unit with one or more processors 604, including without limitation one or more general-purpose processors and/or one or more special-purpose processors (such as digital signal processing chips, graphics acceleration processors, and/or the like); one or more input devices 606, which may include without limitation a remote control, a mouse, a keyboard, and/or the like; and one or more output devices 608, which may include without limitation a presentation device (e.g., controller screen), a printer, and/or the like. In some cases, an output device 608 may include, for example, a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide a non-visual display such as via audio output devices. In general, use of the term "output device" is intended to include a variety of conventional and proprietary devices and ways to output information from computer system 600 to a user.

The computer system 600 may further include (and/or be in communication with) one or more non-transitory storage devices 610, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 600 can also include a communications subsystem 612, which may include without limitation a modem, a network card (wireless and/or wired), an infrared communication device, a wireless communication device and/or a chipset such as a Bluetooth device, 802.11 device, WiFi device, WiMax device, cellular communication facilities such as GSM (Global System for Mobile Communications), W-CDMA (Wideband Code Division Multiple Access), LTE (Long Term Evolution), and the like. The communications subsystem 612 may permit data to be exchanged with a network (such as the network described below, to name one example), other computer systems, controllers, and/or any other devices described herein. In many embodiments, the computer system 600 can further comprise a working memory 614, which may include a random access memory and/or a read-only memory device, as described above.

The computer device 600 also can comprise software elements, shown as being currently located within the working memory 614, including an operating system 616, device drivers, executable libraries, and/or other code, such as one or more application programs 618, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code can be stored on a non-transitory computer-readable storage medium, such as the storage device(s) 610 described above. In some cases, the storage medium might be incorporated within a computer system, such as computer system 600. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 600 and/or might take the form of source and/or installable code, which, upon compilation and/or installation on the computer system 600 (e.g., using any of a variety of generally available compilers, installation programs, compression/decompression utilities, and the like), then takes the form of executable code.

It is apparent that substantial variations may be made in accordance with specific requirements. For example, customized hardware might also be used, and/or particular elements might be implemented in hardware, software (including portable software, such as applets, and the like), or both. Further, connection to other computing devices such as network input/output devices may be employed.

As mentioned above, in one aspect, some embodiments may employ a computer system (such as the computer device 600) to perform methods in accordance with various embodiments of the disclosure. According to a set of embodiments, some or all of the procedures of such methods are performed by the computer system 600 in response to processor 604 executing one or more sequences of one or more instructions (which might be incorporated into the operating system 616 and/or other code, such as an application program 618) contained in the working memory 614. Such instructions may be read into the working memory 614 from another computer-readable medium, such as one or more of the storage device(s) 610. Merely by way of example, execution of the sequences of instructions contained in the working memory 614 may cause the processor(s) 604 to perform one or more procedures of the methods described herein.

The terms "machine-readable medium" and "computer-readable medium," as used herein, can refer to any non-transitory medium that participates in providing data that causes a machine to operate in a specific fashion. In an embodiment implemented using the computer device 600, various computer-readable media might be involved in providing instructions/code to processor(s) 604 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 610. Volatile media may include, without limitation, dynamic memory, such as the working memory 614.

Exemplary forms of physical and/or tangible computer-readable media may include a floppy disk, a flexible disk, hard disk, magnetic tape, or any other magnetic medium, a compact disc, any other optical medium, ROM, RAM, and the like, any other memory chip or cartridge, or any other medium from which a computer may read instructions and/or code. Various forms of computer-readable media may be involved in carrying one or more sequences of one or more instructions to the processor(s) 604 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 612 (and/or components thereof) generally can receive signals, and the bus 602 then can carry the signals (and/or the data, instructions, and the like, carried by the signals) to the working memory 614, from which the processor(s) 604 retrieves and executes the instructions. The instructions received by the working memory 614 may optionally be stored on a non-transitory storage device 610 either before or after execution by the processor(s) 604.

It should further be understood that the components of computer device 600 can be distributed across a network. For example, some processing may be performed in one location using a first processor while other processing may be performed by another processor remote from the first processor. Other components of computer system 600 may be similarly distributed. As such, computer device 600 may be interpreted as a distributed computing system that performs processing in multiple locations. In some instances, computer system 600 may be interpreted as a single computing device, such as a distinct laptop, desktop computer, or the like, depending on the context.

A processor may be a hardware processor such as a central processing unit (CPU), a graphic processing unit (GPU), or a general-purpose processing unit. A processor can be any suitable integrated circuits, such as computing platforms or microprocessors, logic devices and the like. Although the disclosure is described with reference to a processor, other types of integrated circuits and logic devices are also applicable. The processors or machines may not be limited by the data operation capabilities. The processors or machines may perform 512 bit, 256 bit, 128 bit, 64 bit, 32 bit, or 16 bit data operations.

Each of the calculations or operations discussed herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described herein. All features of the described systems are applicable to the described methods mutatis mutandis, and vice versa. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. While the exemplary embodiments have been described in some detail, by way of example and for clarity of understanding, those of skill in the art will recognize that a variety of modification, adaptations, and changes may be employed.

As will be appreciated by one of ordinary skill in the art, the present invention may be embodied as an apparatus (including, for example, a system, a machine, a device, and/or the like), as a method (including, for example, a business process, and/or the like), or as any combination of the foregoing.

Embodiments of the invention can be manifest in the form of methods and apparatuses for practicing those methods.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

We claim:

1. A buoy tracking system, comprising: a plurality of buoy node devices, wherein each of said buoy node devices comprises: a GPS receiver component in communication with a GPS satellite, and capable of receiving and storing location coordinates; a computer processing component having a processor, an electronic storage location operatively coupled with the processor, and processor executable code stored on the electronic storage location and embodied in a tangible non-transitory computer readable medium, the processor executable code comprising machine-readable instructions that, when executed by the processor, cause the processor to extract the location coordinates to iteratively instantiate a node data packet with a quasi-unique buoy identification number, a unique time stamp and stored location coordinates to create a navigational data stream comprised of one or more of the node data packets; and a transceiver component for transmitting the navigational data stream, and for receiving one or more incoming node data packets from other buoy node devices, wherein the plurality of buoy node devices continuously transmits the data node packets to all of the transceiver components within range, and wherein the transceiver components receive a first continuous stream of the data node packets and concurrently transmit a second continuous stream of the node data packets.

2. The system of claim 1, wherein the transceiver component is a multi-channel transceiver, which can support heterogenous data types on each channel.

3. The system of claim 1, which further includes at least one internet device in communication with at least one of the plurality of buoy node devices to provide internet connectivity, wherein the at least one internet device is a land-based device.

4. The system of claim 1, which further includes at least one node gateway, wherein the at least one node gateway includes a filter to reduce redundant transmissions of node data structures, and wherein the at least one node gateway filters said redundant transmissions based on time stamp data.

5. The system of claim 4, wherein the at least one node gateway includes a processor to calculate the distance between the critical position and actual position of a buoy node device, wherein the at least one node gateway includes a processor to compare the distance to a threshold value and instantiate an alert data packet if the distance is greater than the threshold value, and wherein the at least one node gateway is a communications gateway that enables each of the plurality of buoy node devices to use heterogenous protocols to communicate with each of other the plurality of buoy node devices.

6. A mesh network system, comprising: a plurality of buoy node devices, wherein each of the buoy node devices comprises: a GPS receiver component in communication with a GPS satellite, and capable of receiving and storing location coordinates; a computer processing component having a processor, an electronic storage location operatively coupled with the processor, and processor executable code stored on the electronic storage location and embodied in a tangible non-transitory computer readable medium, the processor executable code comprising machine-readable instructions that, when executed by the processor, cause the processor to extract the location coordinates to iteratively instantiate a node data packet with a quasi-unique buoy identification number, a unique time stamp and stored location coordinates to create a navigational data stream comprised of one or more of the node data packets; and a transceiver component for transmitting the navigational data stream, and for receiving one or more incoming node data packets from other buoy node devices; at least one node gateway component which receives and transmits the node data packets and has capabilities to continuously calculate the distance between an actual position and a critical position of each buoy node device, a path traveled by each buoy node device, and a projected path of each buoy node device; and a server, which includes: a server processor which receives and parses information from the node data packets; and one or more database data packets which stores the quasi-unique buoy identification numbers, and at least one set of GPS coordinates associated with a time stamp parsed from one or more node data packets.

7. The system of claim 6, which further includes a user interface configured to receive user input and create a user query, wherein the user query includes one of the quasi-unique buoy identification numbers, and wherein the user query includes GPS coordinates.

8. The system of claim 6, wherein the node gateway component is further configured to transmit an alert if user-defined thresholds are met.

9. The system of claim 6, which further includes a plurality of geographically separated mesh networks which are operatively coupled by the server, and which further includes more than one of the node gateway components.

10. The system of claim 6, wherein the server is further configured to perform an update function to update the GPS coordinates in the database data packet each time the server receives the node data packets.

11. A method for creating a mesh network system comprising the steps of: providing a plurality of buoy node devices for a wireless network, wherein each of the buoy node devices is configured to exchange information with at least one other buoy node device; exchanging information between at least two buoy node devices; and mapping a cluster of buoy node devices and assigning a critical position to each of the buoy node devices which further includes the steps of assigning a scheduling sequence to each of the buoy node devices in the critical position, configuring a gateway communication component to filter redundant buoy node communications, and prioritizing the buoy node devices to receive data, wherein the prioritizing is based on the distance of the buoy node devices from a device providing a connection to a wide area network.

12. The method of claim 11, which further includes the steps of receiving and transmitting node data packets, and calculating the distance between an actual position and a critical position of each the buoy node devices.

13. The method of claim 11, which further includes the steps of calculating the path traveled by one of the buoy node devices, calculating a projected path of each of the buoy node devices, updating a user interface to display a current configuration of each of the buoy node devices, and performing a system query to determine a matching condition for a set of GPS coordinates associated with one or more of the buoy node devices to determine if a sufficient number of the buoy node devices can be detected.

14. The method of claim 11, which further includes the steps of configuring a plurality of geographically separated mesh networks which are operatively coupled by a server component, and configuring one or more gateway communication components to function as a bridge between devices having heterogeneous wireless protocols.

15. The method of claim 11, which further includes the steps of configuring one or more gateway communication components to send an alert if the number of transmissions from adjacent buoy node devices falls below a threshold level for node density transmission, and configuring the server component to perform an update function to update GPS coordinates in a database data structure each time a node data packet is received.

16. The method of claim 11, which further includes the steps of authenticating transmissions initiated by users, populating a database of users, and establishing a rule set for transmission.

17. The method of claim 16, wherein said rule set is selected from a group consisting of: user authentication parameters and transmission parameters.

18. The method of claim 11, which further includes the step of calculating optimized transmission parameters which correspond to a navigation purpose and required placement of the buoy node devices.

* * * * *